(12) United States Patent
Baumann et al.

(10) Patent No.: US 8,403,362 B2
(45) Date of Patent: Mar. 26, 2013

(54) RESTRAINT SYSTEM WITH CLOSEABLE AIR FLOW OPENINGS

(75) Inventors: Karl-Heinz Baumann, Bondorf (DE); Andreas Hirth, Dielheim (DE); Lutz Quarg, Boeblingen (DE); Friedrich Reiter, Sindelfingen (DE); Clark Ruedebusch, Holzgerlingen (DE)

(73) Assignee: Daimler AG, Stuttgart (DE)

( * ) Notice: Subject to any disclaimer, the term of this patent is extended or adjusted under 35 U.S.C. 154(b) by 147 days.

(21) Appl. No.: 12/740,864

(22) PCT Filed: Oct. 30, 2008

(86) PCT No.: PCT/EP2008/009158
§ 371 (c)(1),
(2), (4) Date: Sep. 8, 2010

(87) PCT Pub. No.: WO2009/056308
PCT Pub. Date: May 7, 2009

(65) Prior Publication Data
US 2010/0327568 A1 Dec. 30, 2010

(30) Foreign Application Priority Data

Nov. 2, 2007 (DE) .......................... 10 2007 052 247
Aug. 14, 2008 (DE) .......................... 10 2008 037 811

(51) Int. Cl.
*B60R 21/239* (2006.01)
*B60R 21/231* (2011.01)

(52) U.S. Cl. ....................... 280/739; 280/743.1; 280/729

(58) Field of Classification Search .................. 280/739, 280/743.1, 732, 728.1, 743.2, 729; B60R 21/239, B60R 21/231, 21/205, 21/16
See application file for complete search history.

(56) References Cited

U.S. PATENT DOCUMENTS

| 3,039,184 | A | * | 6/1962 | Kramer ........................... 29/417 |
| 3,675,942 | A | * | 7/1972 | Huber ............................ 280/738 |
| 3,733,091 | A | * | 5/1973 | Fleck et al. .................... 280/729 |
| 3,762,741 | A | * | 10/1973 | Fleck et al. .................... 280/729 |

(Continued)

FOREIGN PATENT DOCUMENTS

| DE | 41 34 837 C2 | 4/1992 |
| DE | 196 33 883 A1 | 2/1998 |

(Continued)

OTHER PUBLICATIONS

International Search Report dated Jan. 19, 2009 with English translation (Six (6) pages).

(Continued)

*Primary Examiner* — Paul N Dickson
*Assistant Examiner* — Keith Frisby
(74) *Attorney, Agent, or Firm* — Crowell & Moring LLP

(57) ABSTRACT

A restraint system having support elements can be transferred from a storage position to a restraint position. Flexible casing elements are disposed between the support elements and have air flow openings, such that the support elements having the flexible casing elements enclose a restraint volume in the restraint position. A resistance element is disposed at each of the air flow openings in order to impede or prevent the escape of air from the restraint volume compared to the inflow at the respective air flow opening. Such resistance elements may be formed by a second layer, displaced fabric threads, flexible fabric web sections and other elements such that a check valve function is provided.

14 Claims, 2 Drawing Sheets

U.S. PATENT DOCUMENTS

| | | | | |
|---|---|---|---|---|
| 3,773,350 | A | * 11/1973 | Shibamoto | 280/729 |
| 3,784,225 | A | * 1/1974 | Fleck et al. | 280/729 |
| 3,791,666 | A | * 2/1974 | Shibamoto | 280/729 |
| 3,792,873 | A | * 2/1974 | Buchner et al. | 280/743.1 |
| 3,843,150 | A | * 10/1974 | Harada et al. | 280/729 |
| 3,883,154 | A | * 5/1975 | McCullough et al. | 280/735 |
| 3,887,213 | A | * 6/1975 | Goetz | 280/738 |
| 3,888,505 | A | * 6/1975 | Shibamoto | 280/738 |
| 3,929,350 | A | 12/1975 | Pech | |
| 3,960,386 | A | * 6/1976 | Wallsten | 280/731 |
| 3,970,328 | A | 7/1976 | Wallsten | |
| 4,076,277 | A | 2/1978 | Kuwakado et al. | |
| 4,126,325 | A | * 11/1978 | Weman | 280/738 |
| 4,500,114 | A | * 2/1985 | Grey, Jr. | 280/742 |
| 5,193,847 | A | 3/1993 | Nakayama | |
| 5,372,381 | A | * 12/1994 | Herridge | 280/743.1 |
| 5,489,117 | A | * 2/1996 | Huber | 280/738 |
| 5,542,695 | A | * 8/1996 | Hanson | 280/729 |
| 5,599,041 | A | * 2/1997 | Turnbull et al. | 280/729 |
| 5,931,497 | A | 8/1999 | Fischer | |
| 2006/0163856 | A1 | 7/2006 | Lehmann | |

FOREIGN PATENT DOCUMENTS

DE    20 2005 001 000 U1    7/2005

OTHER PUBLICATIONS

PCT/ISA/237 (Six (6) pages).

* cited by examiner

RESTRAINT SYSTEM WITH CLOSEABLE AIR FLOW OPENINGS

This application is a national stage of PCT International Application No. PCT/EP2008/009158, filed Oct. 30, 2008, which claims priority under 35 U.S.C. §119 to German Patent Application No. 10 2007 052 247.4, filed Nov. 2, 2007 and No. 10 2008 037 811.9, filed Aug. 14, 2008, the entire disclosures of which are herein expressly incorporated by reference.

BACKGROUND AND SUMMARY OF THE INVENTION

The present invention relates to a restraint system for an occupant of a motor vehicle with support elements that can be transferred from a storage position to a restraint position, and flexible casing elements that are disposed between the support elements and have air flow openings, such that the support elements with the flexible casing elements enclose a restraint volume in the restraint position.

Such restraint systems are for example known from the series-production of passenger motor vehicles in the form of airbags in multiple embodiments. These airbags generally comprise a retaining volume limited by a covering, which can be enlarged from a storage position into a restraint position. The airbag which is usually folded in the storage position is thereby filled with gas in a pyrotechnical manner when an accident is detected, so that it deploys suddenly towards the occupant who dislocates forward, and thus contributes at least indirectly to his restraint. Accordingly, the gas introduced into the covering, usually by means of a gas generator, serves for the deployment of the airbag on the one hand and for achieving the restraint of the respective person on the other hand.

German patent document DE 41 34 837 C2 discloses an airbag for the protection of a vehicle occupant, which has an air-impermeable cloth on the side facing the occupant and an air-permeable cloth on the side of the vehicle body. A disk-shaped part which is movable freely at the edge is arranged at the air-permeable cloth. When the airbag is inflated, additional air passes through the air-permeable cloth and rotates the free part upwards. The open region of the air-permeable cloth is thereby increased. If the airbag collides with the occupant after its expansion, the free part partially covers the air breathing part formed by the air-permeable cloth. The open region of the air breathing part is thereby reduced, so that the air passage from the interior to the exterior of the airbag is also reduced correspondingly.

Furthermore, a support structure airbag is known from the specification P 811338 (internal reference) published later. The support structure can be displaced from a storage position to a restraint position by inflating a plurality of hollow bodies connected to each other, forming a channel system by means of a gas in a targeted manner. Surface elements with air flow openings are provided between the hollow bodies. The surface elements form an airbag together, which encloses the restraint volume. During the deployment of the airbag, air flows through the air flow openings into the interior of the airbag, and when restraining the vehicle occupant, the air flows again to the exterior through the air flow openings. The outflow of the air takes place with the same speed as the inflow apart from air flow openings, which are covered by the occupant himself during an impact. In this case it is however necessary that the restraining function is sustained for a longer period.

It is thus one object of the present invention to sustain the restraining function of a so-called "support structure airbag" for a longer period of time and in a more targeted manner.

This and other objects and advantages are achieved by the restraint system according to the invention for an occupant of a motor vehicle with support elements, which can be transferred from a storage position to a restraint position, and flexible casing elements, which are arranged between the support elements and have air flow openings, such that the support elements with the flexible casing elements enclose a restraining volume with the flexible casing elements in the restraint position. A resistance element is arranged at each of the air flow openings so as to impede or prevent an outflow of air from the restraint volume compared to the inflow at the respective air flow opening.

It is achieved by the resistance elements in an advantageous manner that the air can flow into the airbag formed by the casing elements faster than it can flow out. The desired short deployment time can thereby be combined with the required restraining effect.

The flexible casing elements can form an outer layer as a covering corresponding to one embodiment, and a flexible planar material which embodies several resistance elements can be arranged within the covering as an inner layer, wherein the inner layer also has air flow openings, which are however offset in their lateral position with regard to the air flow openings of the outer layer. In this manner, a check valve function can be realized in a very simple manner by two fabrics or foil layers.

Furthermore, one layer of flexible casing elements can have a supporting function and another layer or a material different from the layer can have a sealing function. The supporting layer can especially be on the outside and the sealing layer or the sealing material can be on the inside during the deployment of the flexible casing elements.

The inner layer can especially be more flexible than the outer layer. Thereby, the outer layer has a support function, and the inner layer has a sealing function.

The inner and/or the outer layer can further have a fabric, and the air flow openings can be formed by displacing weft threads or warp threads. It is thereby prevented that the fabric is damaged when forming the air flow opening and that the airbag loses stability thereby. The inner and/or the outer layer can alternatively have a similar fabric, and the air flow openings can be formed by displacing from one or several elements of the respective layer or the layers.

The resistance elements are preferably respectively individual planar materials in their function as check valves, which are mounted to the casing elements with the air flow openings. The term "planar material" is generally meant to be foils, cloths, and other fabrics. They can be moved easily through air flows, so as to take on a check valve function.

The resistance elements can especially be mounted in a U-shaped manner over the respective air flow opening. The U-shaped resistance elements then bend with an increased inner pressure and close the air flow openings.

In a further embodiment, the resistance elements can respectively be fastened around the respective air flow opening at least three points. During the inflow, an approximately dome-shaped form of the resistance elements results, and during the outflow of the air, they bend again and press against the air flow opening.

It is provided corresponding to another further development that each resistance element is held in a position in which the respective air flow opening is closed at least partially. In this manner, a high restraining force is already available shortly after the complete deployment of the airbag.

The resistance elements can further be fringes or fiber pieces of the casing elements. They are thereby part of the casing elements, and a second layer can be foregone.

The resistance elements can further consist of free particles, adhesive or melted fabric parts, which are brought or melted into the air flow openings in the restraint position of the restraint system. The release of the particles, the application of the adhesive, or the melting on of the openings takes place towards the end of the airbag deployment.

Other objects, advantages and novel features of the present invention will become apparent from the following detailed description of the invention when considered in conjunction with the accompanying drawings.

DETAILED DESCRIPTION OF THE DRAWINGS

The embodiments described in more detail in the following represent preferred embodiments of the present invention.

The starting point of the present invention or of the embodiments are so-called "support structure airbags" as restraint systems. The support structure of the airbag can for example be formed by rods and springs which deploy during an impact of the vehicle (mechanical airbag). The support structure can however also be realized by tubes filled with gas, as shown in the introductory part of the description. The airbag deployed by the support structure then includes a corresponding amount of ambient air.

During the filling of the restraint volume with ambient air, one can distinguish between the two basic principles "intake/ventilation" and "enclosing". In practice, a mixture of these two basic principles (ventilation and enclosing) will mainly result.

Amongst others, the number, size and position of inflow or outflow openings are relevant for the deployment and the restraint function. Their relation for example to the deployment direction (e.g., using back pressure during deployment), support structures, environmental conditions and occupants are important. A principal advantage of the support structure airbag or of the mechanical airbag is that a leakage of the closures (which cannot be prevented, as a practice matter) is not critical even in the vicinity of occupants, as the escaping gas (mainly ambient air) is considerably colder than with conventional airbags.

Figure 1:
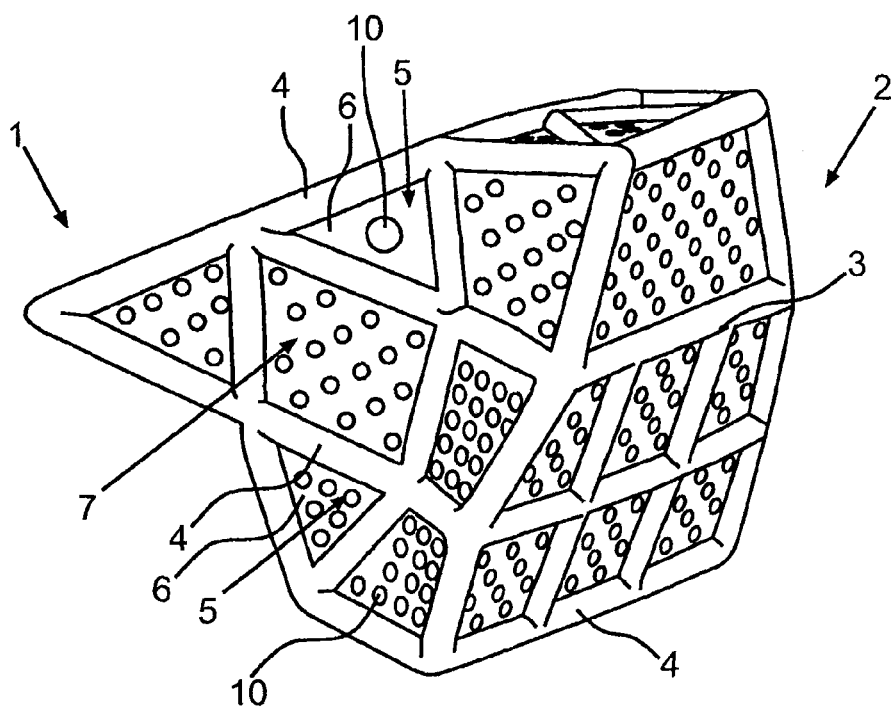
FIG. 1 shows a support structure airbag in its restraint position.

In FIG. 1, which shows the airbag 1 in its completely deployed restraint position, it can be seen that it comprises a support structure 2, which is created by a plurality of hollow bodies 4 connected to each other, forming a channel system 3. The hollow bodies 4 are presently designed as hose-type tube bodies, which are connected to each other as a framework-like or frame-like channel system 3. The hollow bodies 4 thereby presently consist of a flexible hose material to be filled with gas.

By means of the of the hollow bodies 4 connected to each other in a framework manner, individual compartments 5 of the support structure 2 are thus created, which are filled by planar elements 6. These planar elements 6 consist of a flexible material, for example a fabric or rubber material. The planar elements 6 altogether form an airbag or a covering 7, by means of which a restraint volume is enclosed by means of the support structure 2. The casing or planar elements have holes 10 for the inflow and outflow of ambient air.

The present invention is based on the idea that the flow resistance is low during the inflow of the air through the openings of the casing and compared thereto, increased during the outflow, so that an improved restraint effect can be achieved. This basic idea can for example be realized by the principle of the check valve. This can be realized in a first embodiment according to FIG. 2 by means of a two-layer airbag, in which the two layers 8, 9 respectively have openings 10, 11. The functional principle then consists in that the two layers 8, 9 are spaced from each other in a deployment phase of the airbag and that at least partially opened flow openings 10, 11 result thereby. If the two layers are closer together, the flow openings are closed during the restraint phase (at least partially). The airbag is thereby tight or tighter for gases.

Figure 2:
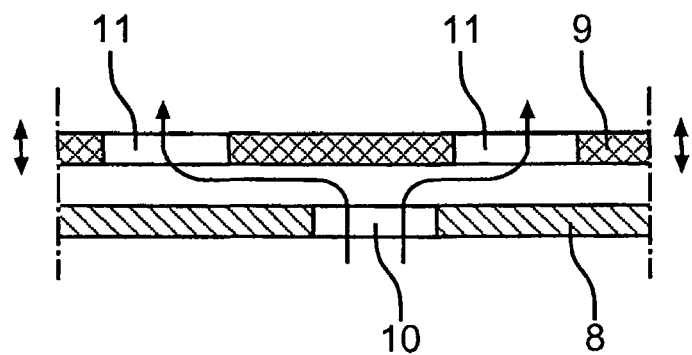
FIG. 2 is a cross section through a part of a two-layer airbag with offset openings.

A concrete embodiment of a two-layer airbag is indicated in FIG. 2. The drawing shows a cross section through a small section of the flexible casing elements. At least two layers are provided, a first layer 8 and a second layer 9. The first or outer layer 8 has holes 10. The second or inner layer 9 also has holes 11. Both layers 8 and 9 are possibly connected to each other in a partial manner. The inner layer 9 facing the volume to be filled has to be able to lift from the outer layer 8, if an excess pressure acts on the outer layer 8. In this case, the air first flows from the outside through the hole 10 of the outer layer, then between the layers 8 and 9, and finally through the holes 11 into the interior of the airbag or restraint system.

If excess pressure acts on the inner layer 9 on the other hand, the outer layer 8 is not allowed to lift from the inner layer 9. This is the case after the deployment phase of the airbag, when the occupant is restrained by the airbag. This function as resistance element can for example be achieved in that the inner layer is larger and/or more flexible than the outer layer.

The layers can additionally consist of different materials. It is particularly advantageous if the inner layer 9, which faces the excess pressure during the restraint phase, is, as mentioned, more elastic or more flexible than the outer layer. The outer layer 8 thus rather has a supporting effect, the inner layer 9 rather a sealing effect.

It is particularly advantageous for the supporting layer 8, if it is not weakened during the manufacture. A weakening can for example take place with a textile fabric by means of seams or a punching process, if threads of the fabric are damaged or severed. During the manufacture, fastenings have however to be sewn to the airbag, and as is shown in the example of FIG. 2, flow openings 10, 11 have to be punched out.

In order to prevent damage of the fabric, the weft threads 12 or the warp threads 13 can be pushed aside in this manner instead of severing manufacturing steps. Corresponding openings 14 are then formed by pushing the threads apart. Alternatively or additionally to the subsequent displacement, the threads can already be placed correspondingly during the weaving process.

Figure 3:
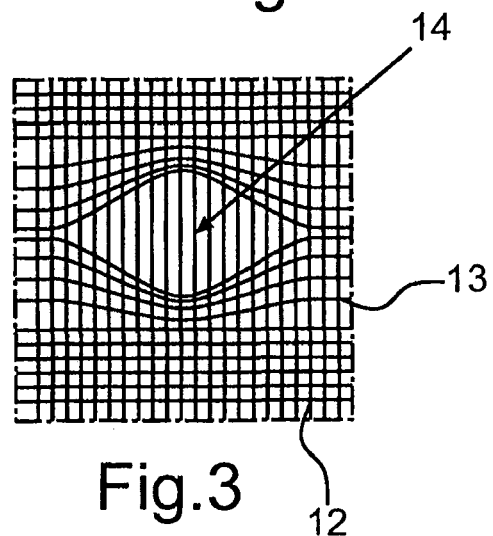
FIG. 3 is a top view of an airbag with displaced warp threads for forming an air flow opening.

Corresponding to a special embodiment, which can be designated as a "restraint system with automatically controlling flow openings", the openings 14 formed according to FIG. 3 can automatically close again at least partially during a load, that is, for example during the restraint phase. This closing can be realized by pulling at both ends of the threads which are pushed apart. The threads pull together by means of the pulling and represent resistance elements. The opening 14 becomes smaller and disappears. If the threads 13 can seal with regard to each other (e.g., by siliconization) the sealing layer, that is the second layer, can possibly be foregone in this embodiment.

Furthermore, airbags are conceivable, which consist of other planar materials, for example of overlapping foil webs. The foil webs can also be displaced with regard to each other, such that openings result. When the foil webs are pulled, the openings close again. This principle of displacing layers or threads can also be transferred to other fiber materials.

Figure 4:
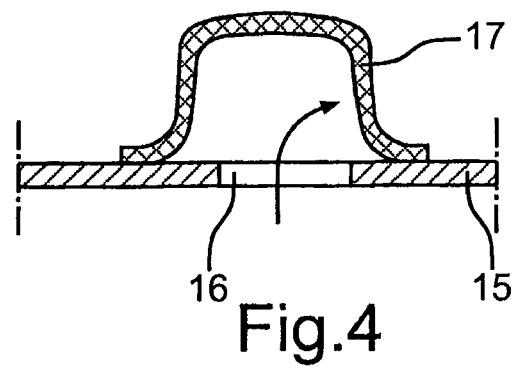
FIG. 4 is a cross section through a section of an airbag with a U-shaped closure structure.

Corresponding to a further embodiment, which will be explained in more detail in connection with FIG. 4, the airbag has planar materials 15 which form the casing of the airbag. An opening 16 is again provided in one of the planar materials 15. The opening 16 is back-stitched with a flexible planar material 17. This planar material 17 can for example be a fabric web and its measure is adjusted to the opening 16 in such a manner that the effective cross section is restricted as little as possible during the inflow. This planar material 17, e.g., a flap, can form a U-shape in its cross section, which projects into the interior of the airbag. During the outflow, the U-shaped flap 17 bends and closes the opening 16. A flap can serve in principle for closing the opening 16, which is fastened to at least one location of the casing 15. The flap 17 is for example advantageously fastened at three points, which are distributed around the opening 16 (possibly in a symmetric manner). The flap is already tightened during the deployment by the three or more fastening points, which leads to lower flow resistances and thus means a lower loss rate.

The check valves can further have an optimized leeway. They can for example be pretensioned in such a manner that they are closed in the normal state (overpressure from neither the interior nor the exterior). This pretensioning can for example be achieved by a plastic spring, but also by a material having a sufficiently high inherent rigidity. In each case it is possible in this manner that an air flow to the exterior does not first have to be built up to close the check valves. An increased restraint force is thereby available in a faster manner.

According to a further preferred embodiment, the flexible planar material (e.g., fabric or foil) already has an integrated valve function. This can for example be achieved by compound materials or by means of one-piece-woven technique if the corresponding material can only be flown through from one side due to the check valve function. A fabric can thus have numerous small holes with respectively small flaps, which are part of the fabric. The fabric can e.g., be a net fabric or a fabric with holes, which has fringes on one side, which cover fabric holes with a corresponding flow direction. On the other hand, particles, which are released in the interior of the airbag after the end of the deployment phase, could clog the initially open holes. The particles then form resistance elements which prevent or impede the outflow of the air. Lint, fine dust or sand grains, but also liquid droplets would be conceivable as particles.

According to a further embodiment, the casing is also formed of two layers, one of which is air-permeable, while the other has a resistance or a sealing function. During the deployment phase, air flows through the outer air-permeable layer, past the inner layer into the interior of the airbag. The inner layer adheres to the outer layer or is melted therewith in the restraint phase. The adherence can for example be achieved with a flowing material and corresponding cohesion or adhesion, but also by means of a solvent. Two component effects can for example also be taken advantage of. Polar materials can possibly also be used. If melting is necessary, it can be achieved in the usual manner by pressure or temperature influence.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A restraint system for an occupant of a motor vehicle, said restraint system comprising:
   support elements, which can be transferred from a storage position to a restraint position, wherein the support elements are arranged in a grid with grid openings between the support elements; and
   flexible casing elements, which are arranged in the grid openings between the support elements and have air flow openings; wherein
      the support elements together with the flexible casing elements, enclose a restraint volume in the restraint position; and
      a resistance element is arranged at each of the air flow openings to impede or to prevent an outflow of air from the restraint volume, and
      both the support elements and the flexible casing elements are exposed on an outer side facing the occupant.

2. The restraint system according to claim 1, wherein:
   the flexible casing elements form an outer layer as a covering; and
   a flexible planar material is arranged within the covering as an inner layer;
   the inner layer embodies resistance elements; and
   the inner layer also has air flow openings, which are offset with regard to the air flow openings of the outer layer.

3. The restraint system according to claim 2, wherein the inner layer is more flexible than the outer layer.

4. The restraint system according to claim 2, wherein:
   at least one of the inner and outer layers comprises a fabric; and
   the air flow openings are formed by displacing at least one of weft threads and warp threads of said fabric.

5. The restraint system according to claim 2, wherein:
   at least one of the inner and outer layers is similar to a fabric; and
   the air flow openings are formed by displacing at least one element of the respective layer or layers.

6. The restraint system according to claim 1, wherein:
   a first layer of flexible casing elements has a supporting function; and
   a second layer or a different material from the first layer has a sealing function.

7. The restraint system according to claim 6, wherein the supporting layer is on the outside and the sealing layer or the sealing material is inside during the deployment of the flexible casing elements.

8. The restraint system according to claim 1, wherein the resistance elements are respectively individual flexible planar materials, which are mounted to the casing elements at the air flow openings.

9. The restraint system according to claim 8, wherein the resistance elements are mounted over the respective air flow opening in a U-shaped manner.

10. The restraint system according to claim 8, wherein the resistance elements are respectively fastened to at least three points around the respective air flow opening.

11. The restraint system according to claim 1, wherein:
   each resistance element is held by a pretension, in a position such that the respective air flow opening is at least partially closed; and
   the at least partial closing is possible faster by means of the pretensioning than without it.

12. The restraint system according to claim 1, wherein the resistance elements are one of fringes and fiber pieces of the casing elements.

13. The restraint system according to claim 1, wherein the resistance elements comprise one of free particles, adhesive and melted fabric parts, which are brought or melted into the air flow openings in the restraint position of the restraint system.

14. The restraint system according to claim 1, wherein the support elements and flexible casing elements are arranged on at least three sides of the restraint system.

* * * * *